(12) United States Patent
Painter et al.

(10) Patent No.: US 10,732,199 B2
(45) Date of Patent: Aug. 4, 2020

(54) MULTI-STAGE MEMS ACCELEROMETER FOR MIXED G-LEVEL OPERATION

(71) Applicant: Apple Inc., Cupertino, CA (US)

(72) Inventors: Christopher C. Painter, Dublin, CA (US); See-Ho Tsang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 320 days.

(21) Appl. No.: 15/849,542

(22) Filed: Dec. 20, 2017

(65) Prior Publication Data

US 2019/0187170 A1     Jun. 20, 2019

(51) Int. Cl.
*G01P 15/125*     (2006.01)
*G01P 15/08*     (2006.01)

(52) U.S. Cl.
CPC ........ *G01P 15/125* (2013.01); *G01P 15/0802* (2013.01); *G01P 2015/0831* (2013.01); *G01P 2015/0862* (2013.01); *G01P 2015/0871* (2013.01)

(58) Field of Classification Search
CPC ............... G01P 15/125; G01P 15/0802; G01P 2015/0831; G01P 2015/0862; G01P 2015/0871
USPC .......................................................... 73/514
See application file for complete search history.

(56) References Cited

U.S. PATENT DOCUMENTS

| | | | |
|---|---|---|---|
| 8,220,330 B2 | 7/2012 | Miller et al. | |
| 8,393,211 B2* | 3/2013 | Kandori | G01P 15/097 |
| | | | 73/504.12 |
| 8,474,316 B2* | 7/2013 | Blonnqvist | G01C 19/5762 |
| | | | 73/504.12 |
| 8,973,439 B1 | 3/2015 | Baldasarre et al. | |
| 9,766,264 B2 | 9/2017 | Qiu et al. | |
| 9,791,274 B2 | 10/2017 | Kamal Said Abdel Aziz et al. | |
| 9,796,578 B2 | 10/2017 | Chen et al. | |
| 10,239,746 B2* | 3/2019 | Kuang | B81B 3/0051 |
| 2004/0199347 A1* | 10/2004 | Painter | G01C 19/56 |
| | | | 702/92 |
| 2007/0034005 A1* | 2/2007 | Acar | G01C 19/5719 |
| | | | 73/504.02 |

(Continued)

*Primary Examiner* — Natalie Huls
*Assistant Examiner* — Monica S Young
(74) *Attorney, Agent, or Firm* — Fish & Richardson P.C.

(57) ABSTRACT

A multi-stage MEMS accelerometer is disclosed that includes a MEMS sensor that has two suspended structures (proof masses) suspended by suspension members. The suspended structures move together in response to input acceleration when less the acceleration is less than a threshold value. When the input acceleration is greater than the threshold value, one of the suspended structures makes contact with a mechanical stop while the other suspended structure continues to move with increased stiffness due to the combined stiffness of the suspension members. The contact with the mechanical stop contributes a nonlinear mechanical stiffening effect that counteracts the nonlinear capacitive effect inherent in capacitive based MEMS accelerometers. In some embodiments, more than two suspended structures can be used to allow for optimization of sensitivity for multiple full-scale ranges, and for higher fidelity tuning of mechanical sensitivity with nonlinear capacitance. In some embodiments, compliant mechanical stops are used.

11 Claims, 7 Drawing Sheets

(56) References Cited

U.S. PATENT DOCUMENTS

| | | | |
|---|---|---|---|
| 2011/0094302 A1* | 4/2011 | Schofield | G01C 19/5733 73/504.12 |
| 2013/0239679 A1* | 9/2013 | Kornilovich | G01C 19/5712 73/504.12 |
| 2014/0260613 A1* | 9/2014 | Qiu | G01C 19/5733 73/504.15 |
| 2014/0300425 A1* | 10/2014 | Cazzaniga | G01C 19/5776 331/154 |
| 2017/0156002 A1* | 6/2017 | Han | H04R 1/14 |
| 2017/0328931 A1* | 11/2017 | Zhang | B81B 3/0051 |
| 2018/0135985 A1* | 5/2018 | Song | B81B 7/02 |

* cited by examiner

MULTI-STAGE MEMS ACCELEROMETER FOR MIXED G-LEVEL OPERATION

TECHNICAL FIELD

This disclosure relates generally to capacitive based micro-electromechanical systems (MEMS) accelerometers.

BACKGROUND

Higher full-scale ranges in capacitive based MEMS accelerometers are desirable for applications that involve high dynamics. In some cases, these high dynamics only occur on rare occasions. The accelerometer designer, however, typically has to design the MEMS sensor to accommodate the highest dynamics regardless of how often it occurs. Enabling these higher full-scale ranges normally requires MEMS sensor design changes, such as making the MEMS sensor stiffer or increasing the capacitive gap. These MEMS sensor design changes may result in degraded sensitivity of the MEMS sensor, resulting in higher signal-to-noise (SNR) or worse strain immunity.

SUMMARY

A multi-stage MEMS accelerometer for mixed g-level operation is disclosed. In an embodiment, a micro-electromechanical systems (MEMS) accelerometer comprises: a substrate; one or more mechanical stops; a first suspended structure attached to, or formed in, the substrate by a first suspension member having a first stiffness and configured to move in response to input acceleration being less than a first threshold level; a second suspended structure attached to the first suspended structure by a second suspension member having a second stiffness, the second suspended structure configured to move in response to the input acceleration being less than the first threshold level and to make contact with the one or more mechanical stops when the input acceleration is more than the first threshold level, and wherein the first suspended structure is configured to continue to move on the first and second suspension members with increased stiffness after the contact is made; and a readout circuit configured to measure the input acceleration based on movement of the first suspended structure.

In an embodiment, an electronic system comprises: a multi-stage micro-electromechanical systems (MEMS) accelerometer that includes a MEMS sensor that has two structures suspended by suspension members, the suspended structures configured to move together in response to input acceleration when the input acceleration is less than a threshold value, and when the input acceleration is greater than the threshold value, one of the suspended structures makes contact with one or more mechanical stops while the other suspended structure continues to move with increased stiffness due to the combined stiffness of the suspension members; a readout circuit configured to: convert a change in differential capacitance between electrodes of the MEMS sensor to differential voltage signals; and calculate acceleration data based on the differential voltage signals; one or more processors; memory coupled to the one or more processors and storing instructions that when executed by the one or more processors, cause the one or more processors to perform operations comprising: obtaining the acceleration data from the MEMS accelerometer; calculating a location of the electronic system using the acceleration data; and displaying the location on a display device of the electronic system.

Particular implementations disclosed herein provide one or more of the following advantages. A multi-stage MEMS accelerometer allows for higher full-scale ranges for applications that involve high dynamics (e.g., >32 g, 1 g=9.8 m/s$^2$) without degrading the sensitivity of the MEMS sensor or worsening the immunity of the MEMS sensor to strain. Moreover, the contact of one or more suspended structures during high dynamics contributes to a mechanical stiffening of the other sense mass that counteracts the nonlinear capacitive effect inherent in capacitive based MEMS accelerometers.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

System Overview

A multi-stage MEMS accelerometer is disclosed that includes a MEMS sensor that has two structures (proof masses) suspended by suspension members. When an input acceleration is less than a threshold value, the suspended structures move together. When the input acceleration is greater than the threshold value, one of the suspended structures makes contact with one or more mechanical stops while the other suspended structure continues to move with increased stiffness due to the combined stiffness of the suspension members. The contact with the one or more mechanical stops contributes a nonlinear mechanical stiffening effect that counteracts the nonlinear capacitive effect inherent in capacitive based MEMS accelerometers. In some embodiments, more than two suspended structures can be used to allow for optimization of sensitivity for multiple full-scale ranges, and for higher fidelity tuning of mechanical sensitivity with nonlinear capacitance. In some embodiments, gradual stopping is used (e.g., compliant mechanical stoppers) instead of abrupt stopping to reduce the rebound effect after a collision of a suspended structure with a mechanical stop.

System Dynamics

Figure 1B:
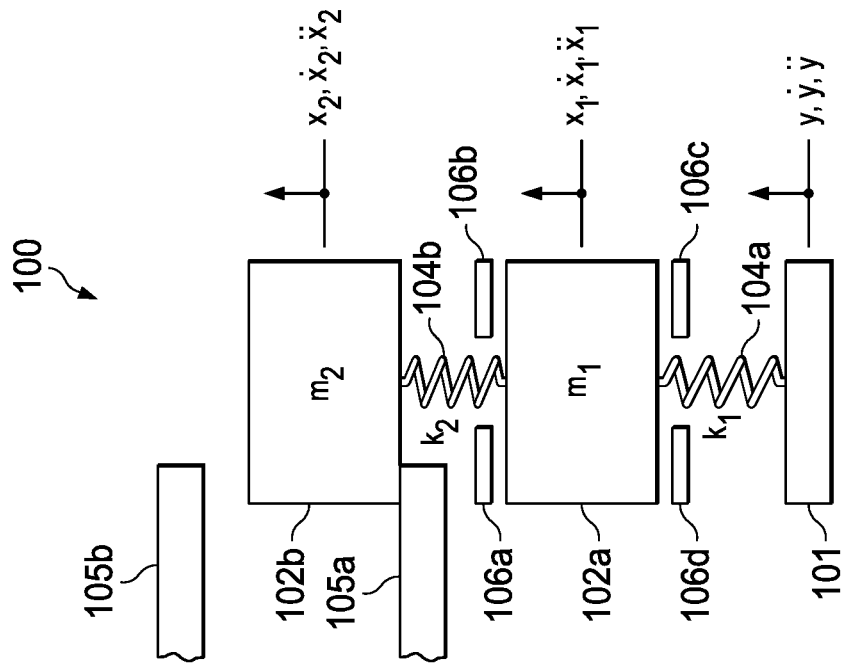
FIGS. 1A and 1B are conceptual drawings illustrating the dynamics of a two-stage MEMS accelerometer for mixed g-level operations, according to an embodiment.
Figure 1A:
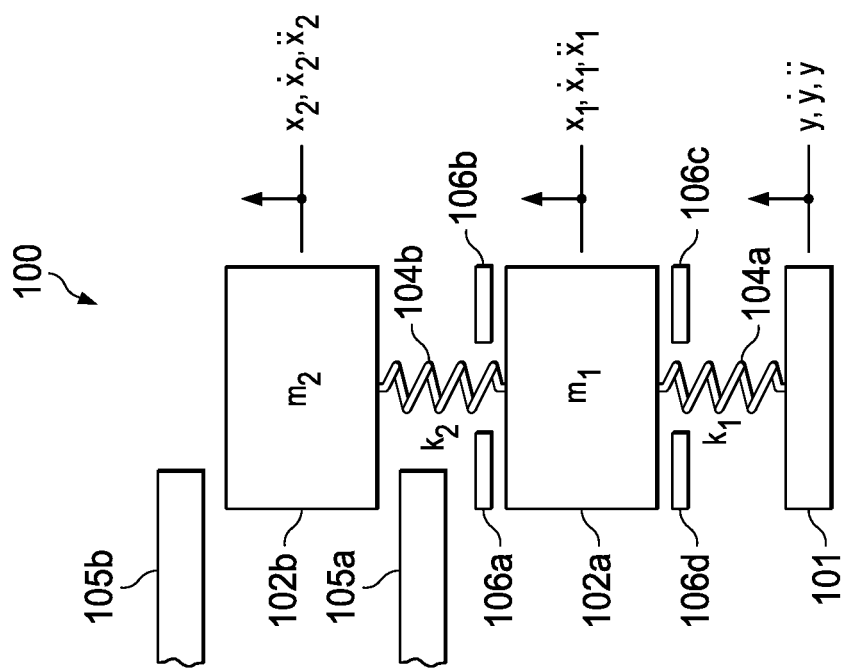

FIGS. 1A and 1B are conceptual drawings illustrating the dynamics of a two-stage MEMS accelerometer for mixed g-level operations, according to an embodiment. System 100 includes substrate 101, sense mass 102a ($m_1$), mass 102b ($m_2$), springs 104a, 104b, mechanical stops 105a, 105b and electrodes, 106a-106d.

Referring to FIG. 1A, when the input acceleration $\ddot{y}$ is below a threshold value (e.g., $\ddot{y}$<32 g), both masses 102a, 102b move in response to the input acceleration. When mass 102b is not in contact with mechanical stop 105a the dynamics of system 100 are described by the following equations:

$$m_1\ddot{x}_1 + k_1 x_1 + k_2(x_1-x_2) - k_1 y = 0, \quad [1]$$

$$m_2\ddot{x}_2 + k_2 x_2 - k_1 y = 0, \quad [2]$$

$$z = x_1 - y, \quad [3]$$

$$w = x_1 - x_2, \quad [4]$$

$$m_1\ddot{z} + k_1 z + k_2 w = -m_1\ddot{y} \quad [5]$$

$$m_2\ddot{z} - m_2\ddot{w} - k_2 w = -m_2\ddot{y}, \quad [6]$$

where $x_1$, $\dot{x}_1$, $\ddot{x}_1$ are the position, velocity and acceleration, respectively, of mass 102a $x_2$, $\dot{x}_2$, $\ddot{x}_2$ are the position, velocity and acceleration, respectively, of mass 102b and $k_1$ and $k_2$ are spring constants for springs 104a, 104b, respectively, and where $y$, $\dot{y}$, $\ddot{y}$ are the position, velocity and acceleration, respectively, of substrate 101 rigidly attached to the system where acceleration is being measured, and z is the relative displacement of mass 102a from substrate 101.

When system 100 is operating in steady state, the dynamic equations for system 100 above reduce to:

$$k_1 z + k_2 w = -m_2\ddot{y} \quad [7]$$

$$-k_2 w = -m_2\ddot{y} \quad [8]$$

$$z = \frac{-(m_1 + m_2)}{k_1}\ddot{y} \quad [9]$$

Referring to FIG. 1B, when acceleration input $\ddot{y}$ is above the threshold value (e.g., $\ddot{y}$>32 g), mass 102b makes contact with mechanical stop 105a, but sense mass 102a continues to move on springs 104a, 104b with increased mechanical stiffness. When mass 102b makes contact with mechanical stop 105a the dynamics of system 100 are described by the following equation:

$$m_1\ddot{z} + (k_1+k_2)z = -m_1\ddot{y}. \quad [10]$$

When system 100 is operating in steady state, the dynamic equations for system 100 above reduce to:

$$(k_1+k_2)z = -m_1\ddot{y}, \quad [11]$$

-continued
$$z = \frac{-m_1}{(k_1+k_2)}\ddot{y}, \quad [12]$$

Accordingly, the acceleration scale factors (SF) are given by:

$$SF_1 = \frac{-(m_1+m_2)}{k_1}\ddot{y}, \quad \text{for input} < 32 \text{ g} \quad [13]$$

$$SF_2 = \frac{-m_1}{(k_1+k_2)}\ddot{y}, \quad \text{for input} > 32 \text{ g}. \quad [14]$$

As shown by the scale factor equations above, when system 100 is detecting less than 32 g of acceleration, $SF_1$ is a function of the sum of the two masses $m_1$, $m_2$ and the single spring constant $k_1$. When system 100 is detecting more than 32 g, mass $m_2$ is in contact with mechanical stop 105a, and $SF_2$ is a function of the sense mass $m_1$ and the two spring constants $k_1$, $k_2$, resulting in a mechanical stiffening of system 100.

Note that the example above includes a single threshold value of 32 g. Those with ordinary skill in the art, however, will recognize that system 100 can be designed with any desired threshold value, and that multiple threshold values or threshold ranges can be used in place of the example threshold value of 32 g. Also, as described in reference to FIG. 4, any number of masses can be used in system 100. In some embodiments, the actual values of the masses and spring constants can be determined through simulation or empirically based on the application and a desired acceleration threshold value.

Figure 2A:
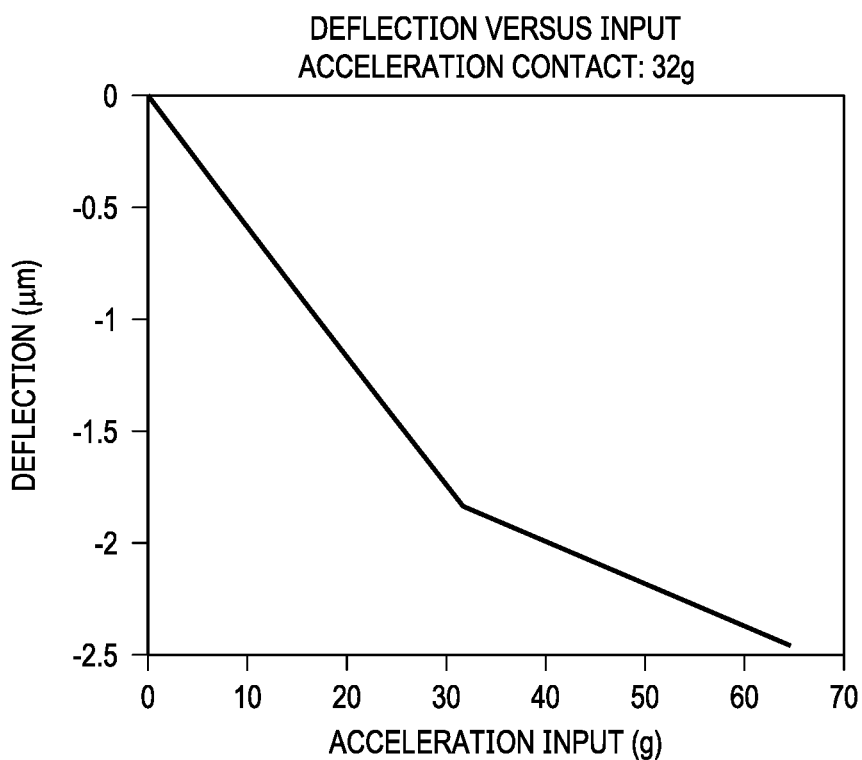
FIGS. 2A and 2B are plots illustrating the stabilizing effect that mechanical stiffening nonlinearity has on capacitive nonlinearity, according to an embodiment.
Figure 2B:
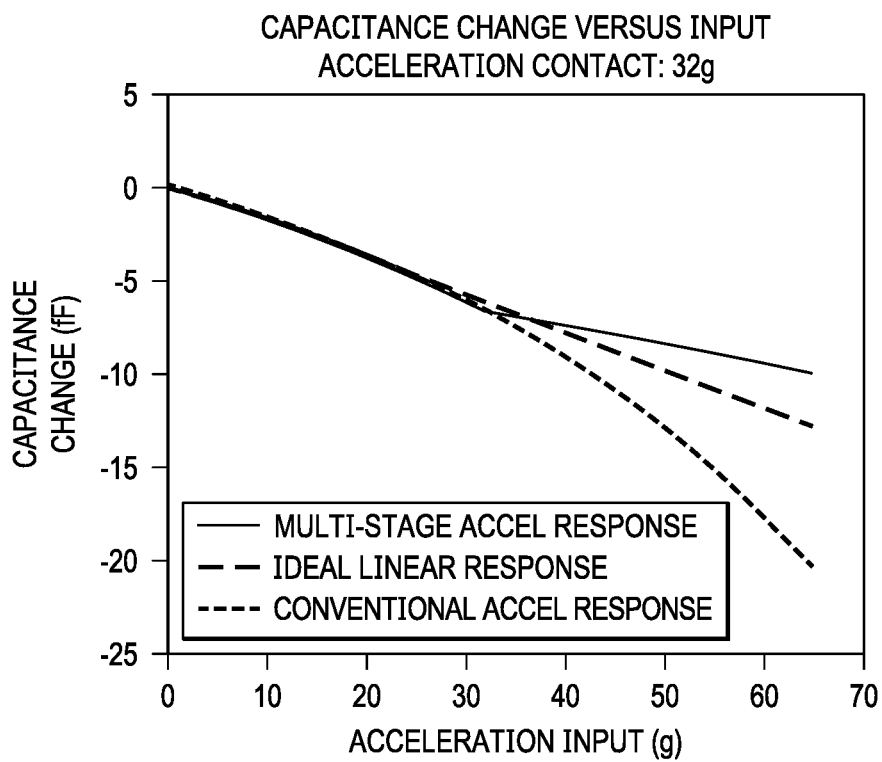

FIGS. 2A and 2B are plots illustrating the stabilizing effect that mechanical stiffening nonlinearity has on capacitive linearity, according to an embodiment.

Referring to FIG. 2A, a plot of deflection versus acceleration with contact at 32 g is shown. The steady state deflection Z can be determined using the following equation:

$$Z = \quad [15]$$
$$\frac{-(m_1+m_2)}{k_1}a_{in} + \left[\frac{(m_1+m_2)}{k_1}a_{in} - \frac{(m_1+m_2)}{k_1}(32 \text{ g})\right]H(a_{in}-32 \text{ g}) +$$
$$\left[\frac{-m_1}{k_1+k_2}(a_{in}-32 \text{ g})\right]H(a_{in}-32 \text{ g}),$$

where H is a Heaviside step function that is discontinuous and has a value of zero for negative argument and one for positive argument and $a_{in}$ is the input acceleration. As can be observed in FIG. 2A, after the input acceleration exceeds 32 g, the slope of deflection is reduced due to increased stiffening caused by the combined stiffness of the two springs when mass 102b makes contact with mechanical stop 105a. The spring constants can be the same or they can be different based on different design tradeoffs (e.g., thresholds, sensitivity, etc.).

Referring to FIG. 2B, plots of capacitance change versus input acceleration with contact at 32 g is shown. The three plots shown are for multistage accelerometer output, a $3^{rd}$ order fit to input acceleration typical of a conventional accelerometer and an ideal linear response to input acceleration. The capacitance change can be determined using the following equation derived from a Taylor series expansion carried out to the $3^{rd}$ power:

$$\Delta C = \frac{2C_0}{d}z + \frac{2C_0}{d^3}z^3, \quad [16]$$

where $C_0$ is the rest capacitance, z is the deflection and d is the gap spacing. As can be observed from the plots the mechanical stiffening nonlinearity has a stabilizing effect on the capacitive nonlinearity inherent in conventional accelerometers.

Figures 3A, 3B:
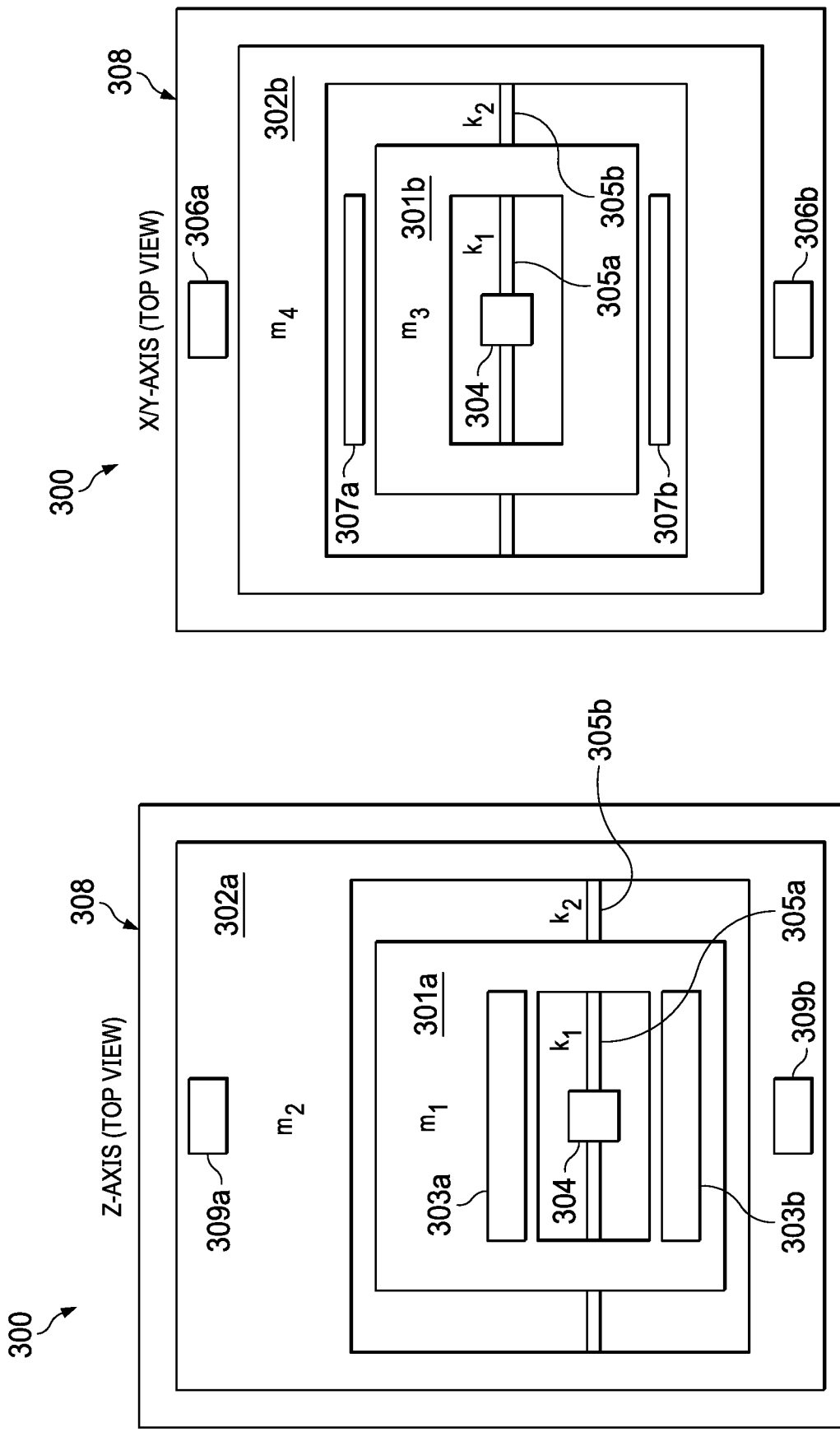
FIGS. 3A and 3B are top views of an out-of-plane and in-plane, respectively, two-stage, capacitive based MEMS sensor, according to an embodiment.

FIGS. 3A and 3B are top views of an out-of-plane and in-plane, respectively, two-stage, capacitive based MEMS sensor, according to an embodiment. Capacitive based MEMS accelerometers measure changes of the capacitance between a proof mass and a fixed conductive electrode separated by a narrow capacitive gap.

FIG. 3A depicts an out-of-plane torsional type accelerometer where first suspended structure 301a has a mass $m_1$ and second suspended structure 302a has mass $m_2$. The suspended structures are made of semiconductor material (e.g., polysilicon). Each structure 301a, 302a has a heavy side and a light side, which causes structures 301a, 302a to torsionally deflect in the z direction about anchor 304 in response to input acceleration. FIG. 3B depicts an in-plane linear motion type accelerometer where first suspended structure 301b has a mass $m_3$ and second suspended structure 302b has a mass $m_4$. Each structure 301b, 302b deflects linearly in the x/y plane in response to input acceleration.

Structures 301a, 301b are attached to suspension members 305a, 305b and move within an opening (e.g., a window, cavity, recess or hole) formed in structures 302a, 302b, respectively, in response to input acceleration being less than a threshold value. Suspension members 305a, 305b are attached to substrate 308 by anchor 304. Suspension members 305a, 305b each have a stiffness that is represented by spring constants $k_1$, $k_2$, respectively, as described in reference to FIGS. 1A and 1B. The stiffness can be the same or different. Out-of-plane mechanical stops 309a, 309b are attached to, or formed in substrate 308. Out-of-plane electrodes 303a, 303b are attached to, or formed in, substrate 308. In-plane electrodes 307a, 307b are attached to, or formed in, substrate 308. In-plane mechanical stops 306a, 306b are attached to, or formed in, substrate 308.

The dynamics of two-stage, MEMS sensor 300 is described in reference to FIGS. 1A, 1B. When the input acceleration is less than a threshold value, (e.g., <32 g) structures 301a, 301b, 302a, 302b move in response. When the input acceleration is greater than the threshold value (e.g., >32 g), suspended structures 302a and 302b make contact with mechanical stops 302a, 302b and 306a, 306b, respectively, but suspended structures 301a, 301b continue to move (e.g., deflect) on suspension members 305a, 305b, resulting in a stiffening of structures 301a, 301b. This stiffening effect allows sensing of higher dynamics at full-scale, as described in reference to FIGS. 1A and 1B.

Figure 6:
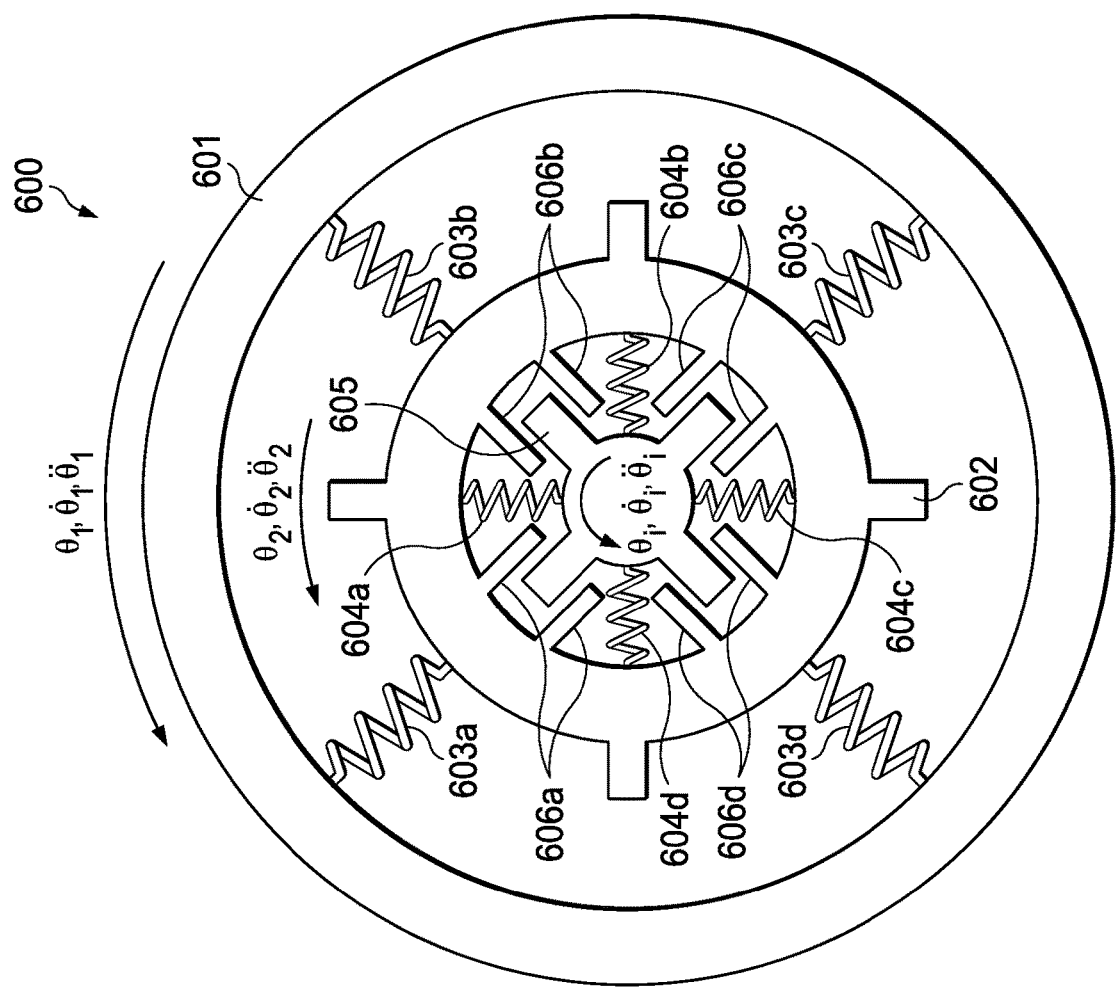
FIG. 6 is a conceptual drawing illustrating the dynamics of an angular MEMS accelerometer for mixed g-level operations, according to an embodiment.

Note that suspension members 305a, 305b are one example of soft springs that can be used to allow movement of the suspended structures in response to input acceleration. Although the design shown uses suspension members 305a, 305b, any number or type of MEMS structures (e.g., torsion bars, anchors, deformable beams, hinges, membranes) can be used in any desired combination to allow movement of suspended structures 301a, 301b, 302a, 302b. Also, the MEMS structures can have any desired geometric shape including rectangular, circular, shapes, as shown in FIGS. 3A-3B and FIG. 6. The suspended structure used for capacitive sensing need not be contained within an opening of another suspended structure as shown in FIGS. 3A and 3B. For example, in other embodiments the suspended structures can be placed side-by-side and attached to a common anchor in a pendulous or "teeter-totter" configuration.

Figure 4:
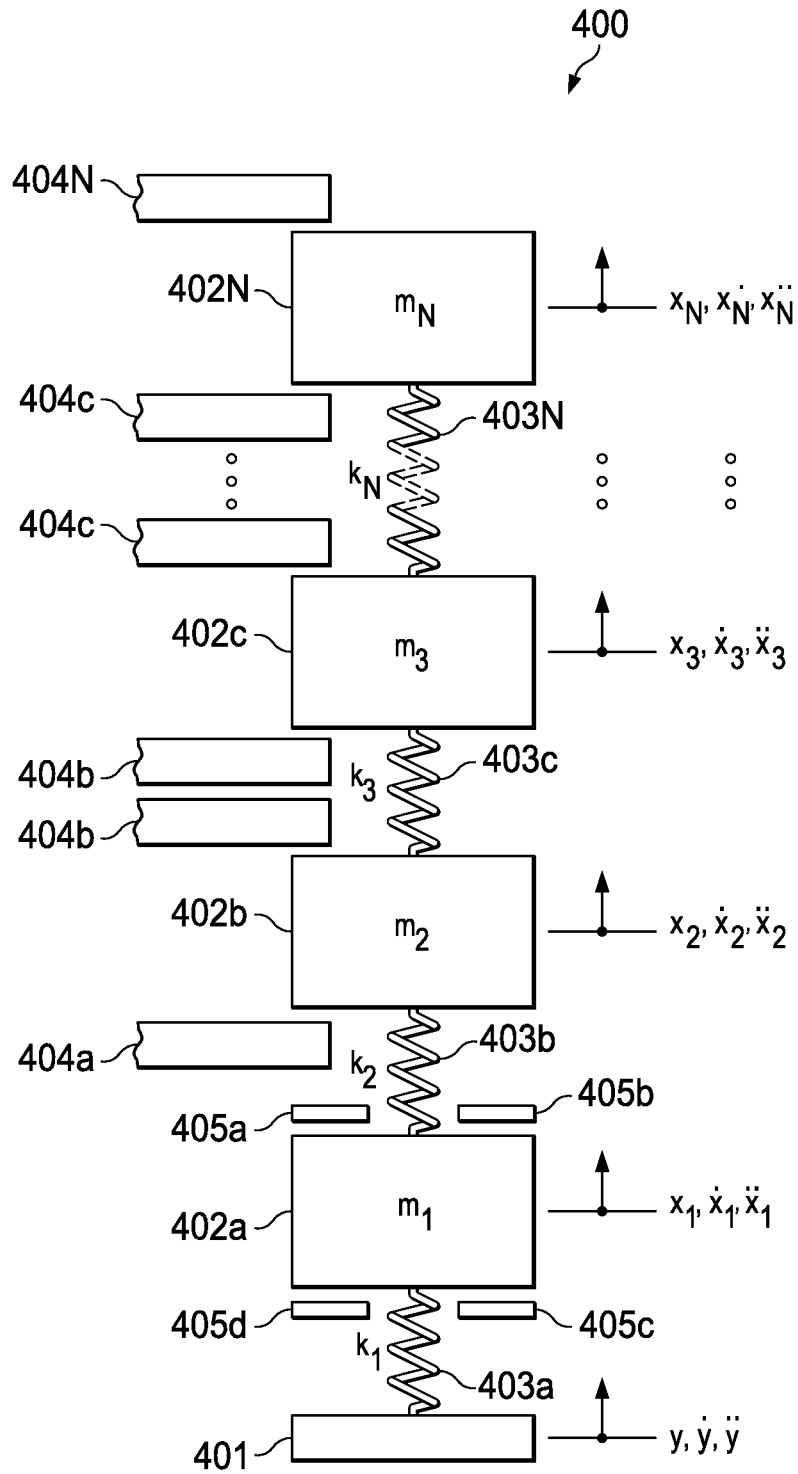
FIG. 4 is a conceptual drawing illustrating the dynamics of a multi-stage MEMS accelerometer for mixed g-level operations, according to an embodiment.

FIG. 4 is a conceptual drawing illustrating the dynamics of a multi-stage MEMS accelerometer for mixed g-level operations, according to an embodiment. The dynamics described in reference to FIGS. 1A, 1B can be extended to N stages, as shown in FIG. 4. System 400 includes sense mass 402a with electrodes 405a-405d, masses 402b-402N, soft springs 403a-403N and mechanical stops 404a-404N.

Each of masses 402b-402N can make contact with their respective mechanical stops 404a-404N at different input acceleration threshold levels. In the example shown, masses 402b, 402c, 402N make contact with mechanical stops 404a, 404b and 404c, respectively, at threshold values 96 g, 64 g and 32 g. Soft springs 403a-403N having respective spring constants $k_1$-$k_N$ are disposed between masses 402a-402N. The example multi-stage configuration shown in FIG. 4 allows for more optimization of sensitivity for multiple full-scale ranges and allows for higher fidelity tuning of mechanical sensitivity with nonlinear capacitance.

Figure 5:
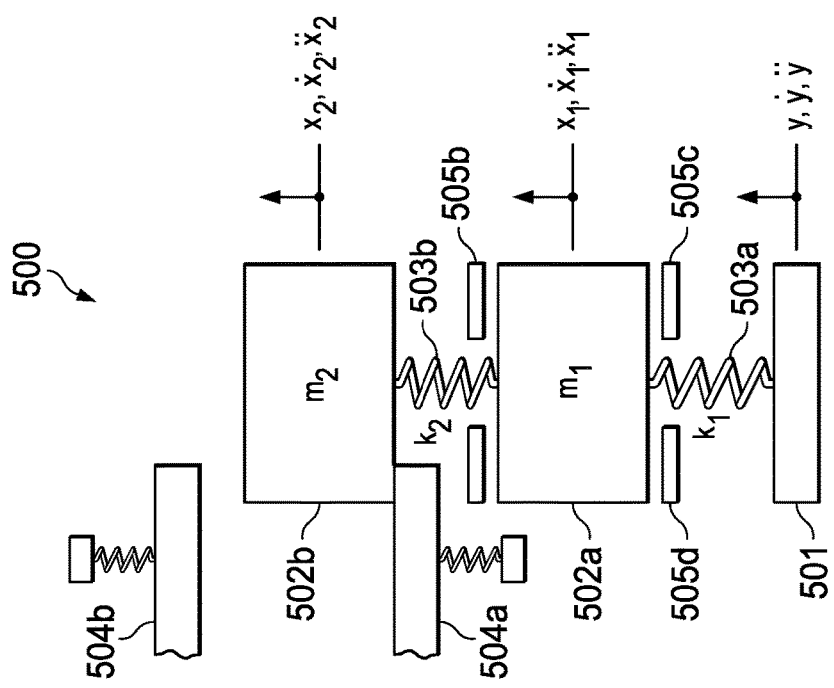
FIG. 5 is a conceptual drawing illustrating the dynamics of a two-stage MEMS accelerometer for mixed g-level operations with a compliant mechanical stop that reduces a rebound effect after contact, according to an embodiment.

FIG. 5 is a conceptual drawing illustrating the dynamics of a two-stage MEMS accelerometer for mixed g-level operations that reduces the rebound effect after a contact with a mechanical stop, according to an embodiment. System 500 includes sense mass 502a having electrodes 505a-505d, mass 502b, springs 503a, 503b (having respective spring constants $k_1$, $k_2$) and compliant mechanical stops 504a, 504b. Compliant mechanical stops 504a, 504b allow for gradual stopping of contact mass 502b instead of abrupt stopping when contact mass 502b makes contact with compliant mechanical stop 504a or 504b, thus reducing the rebound effect after contact is made.

FIG. 6 is a conceptual drawing illustrating the dynamics of an angular MEMS accelerometer for mixed g-level operations, according to an embodiment. System 600 includes suspended structure 601, suspended structure 602, circular substrate 605, torsional springs 603a-603d suspended structure 601 and torsional springs 604a-604d suspended structure 602. Structure 602 includes mechanical stops 606a-606d.

When the input angular acceleration $\ddot{\theta}_i$ is less than a threshold value (e.g., <32 g), suspended structures 601, 602 rotate in response at angular accelerations $\ddot{\theta}_2$, $\ddot{\theta}_1$, respectively. When the input acceleration is greater than the threshold value (e.g., >32 g), structure 602 makes contact with one or more of mechanical stops 606a-606d, but structure 601 continues to rotate, resulting in a stiffening of the MEMS sensor, which allows for sensing of higher dynamics at full-scale.

Example Signal Processing

Figure 7:
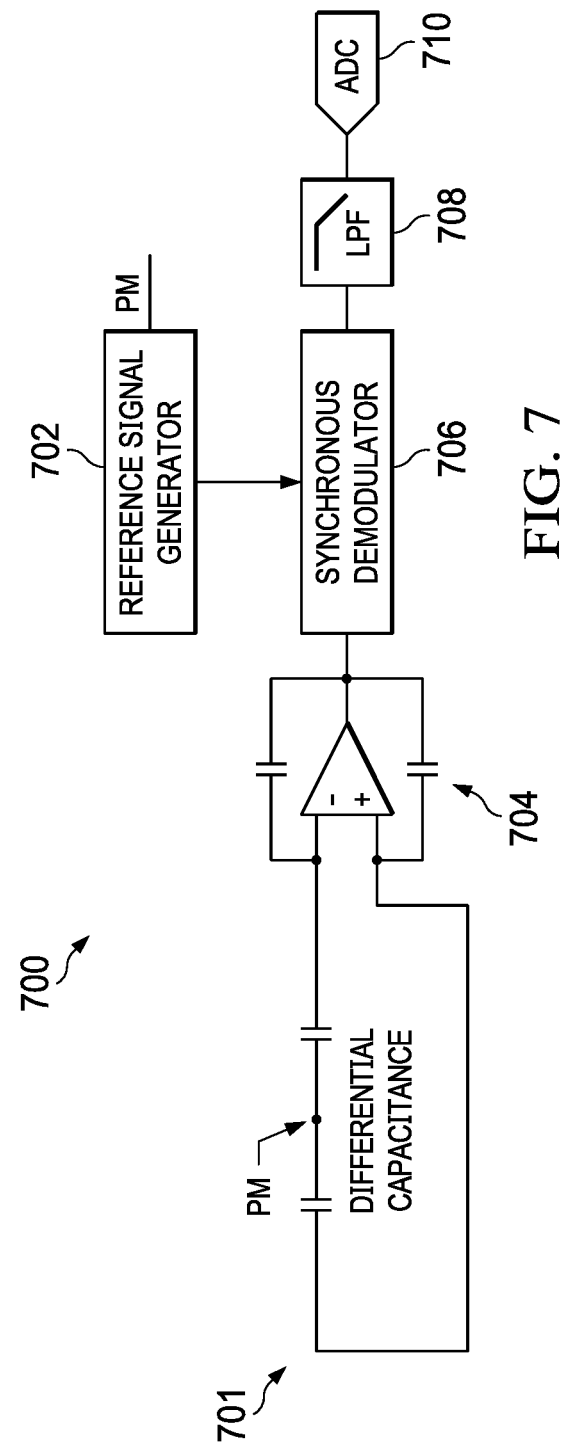
FIG. 7 is a flow diagram of a readout circuit for processing differential capacitance of a MEMS accelerometer for mixed g-level operations, according to an embodiment.

FIG. 7 is a flow diagram of a readout circuit for processing differential capacitance of the MEMS accelerometer for mixed g-level operations, according to an embodiment. Readout circuit 700 implements a synchronous demodulation technique to reduce noise, increase linearity and dynamic range. In an embodiment, readout circuit 700 includes differential capacitors 701 comprising electrode pairs, reference signal generator 702, amplifier 704, synchronous demodulator 706, low-pass filter 708 and analog-to-digital converter (ADC) 710. The reference signal (PM) can be an AC voltage signal that can be a square-wave or sinusoidal signal. The reference signal PM is applied to suspended structures (e.g., suspended structures 301, 302, 601, 602) that form differential capacitive pairs with electrodes attached to, or formed in, substrate 308.

Amplifier 704 is used to convert the differential sensing capacitance value to an amplified AC voltage and can be, for example, a trans-impedance amplifier. The amplified AC voltage is input into synchronous demodulator 706, which operates at the excitation frequency $f_e$ and is controlled by control signal $X_c(t)$. The output voltage of synchronous demodulator 706, $V_{out}$ is proportional to the product of the differential capacitance $(C_+-C_-)$ and feedback capacitor $C_f$ of amplifier 704:

$$V_{out} \propto \frac{1}{C_f}(C_+ - C_-) \quad [17]$$

The output voltage, Vow, of synchronous demodulator 706 is input into low-pass filter 708, which outputs a DC output signal with an amplitude and phase corresponding to the sensed capacitance change. Low-pass filter 708 (e.g., a Bessel filter) limits the bandwidth, and thus increases the resolution of the voltage signal. ADC 710 converts the filtered DC output signal into a digital value, which can be used by various applications, as described in reference to FIG. 8. ADC converter 710 can be implemented using, for example, a delta-sigma ADC. In an embodiment, feedback can be included to increase the dynamic range of circuit 700.

Example System Architecture

Figure 8:
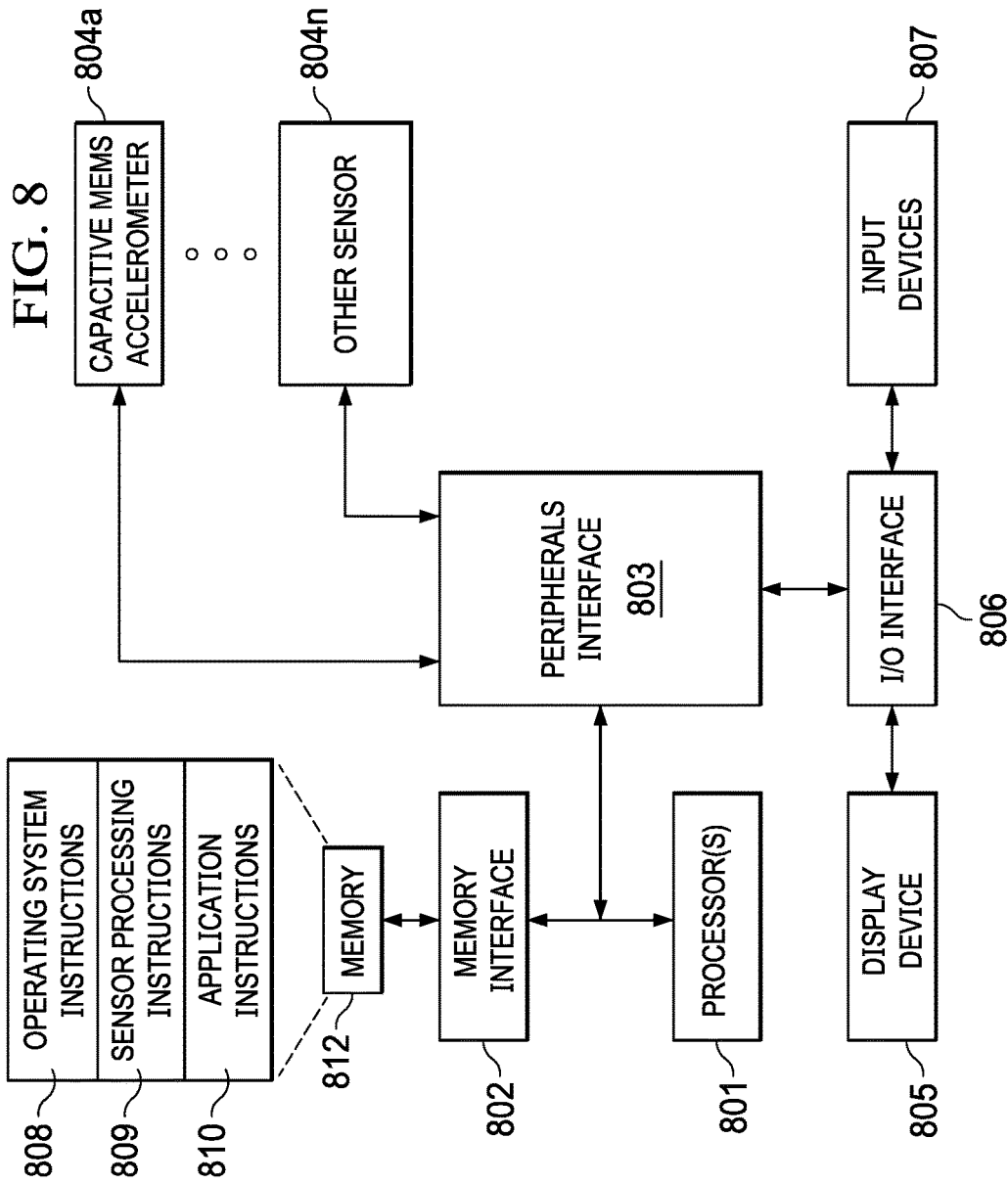
FIG. 8 is architecture for an electronic system that uses a multi-stage, MEMS accelerometer for mixed g-level operations, according to an embodiment.

FIG. 8 is architecture for an electronic system that uses a multi-stage, MEMS accelerometer for mixed g-level operations, according to an embodiment. Architecture 800 can be included in any electronic device that uses motion sensors, including but not limited to: smart phones, tablet computers, wearable devices (e.g., a smart watch) and automotive systems.

Architecture 800 includes processor(s), memory interface 802, peripherals interface 803, motion sensors 804a . . . 804n, display device 805 (e.g., touch screen, LCD display, LED display), I/O interface 806 and input devices 807 (e.g., touch surface/screen, hardware buttons/switches/wheels, virtual or hardware keyboard, mouse). Memory 812 can include high-speed random access memory and/or non-volatile memory, such as one or more magnetic disk storage devices, one or more optical storage devices and/or flash memory (e.g., NAND, NOR).

Memory 812 stores operating system instructions 808, sensor processing instructions 809 and application instructions 812. Operating system instructions 808 include instructions for implementing an operating system on the device, such as iOS, Darwin, RTXC, LINUX, UNIX, WINDOWS, or an embedded operating system such as VxWorks. Operating system instructions 808 may include instructions for handling basic system services and for performing hardware dependent tasks. Sensor-processing instructions 809 perform post-processing on motion sensor data (e.g., averaging) and provide control signals to motion sensors. Application instructions 810 implement software programs that use data from one or more motion sensors 804a . . . 804n, such as navigation, digital pedometer, tracking or map applications. At least one motion sensor 804a is the multi-stage, capacitive based MEMS accelerometer, described in reference to FIGS. 3A, 3B, 4 and 6.

For example, in a navigation application executed on a smart phone, acceleration data is provided by the capacitive MEMS accelerometer to processor(s) 801 through peripheral interface 803. Processor(s) 801 execute sensor-processing instructions 809, to perform further processing of the acceleration data (e.g., averaging). Processor(s) 801 execute instructions for the navigation application, which draws a map on display device 805 including a location marker that shows the location of the smartphone on the map. The acceleration data is used to determine the speed and direction of the smart phone on the map. If a user is walking with the smartphone, the acceleration data can be used to count steps using known digital pedometer techniques. The step count can be multiplied by the user's stride length to determine a distance traveled by the user. Accordingly, the navigation application benefits from the multi-stage, capacitive based MEMS accelerometer embodiments disclosed herein by obtaining more accurate measurements of acceleration from which a more accurate speed, direction and distance traveled can be determined.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A micro-electromechanical systems (MEMS) accelerometer comprising:
    a substrate;
    one or more mechanical stops;
    a first suspended structure attached to, or formed in, the substrate by a first suspension member having a first stiffness and configured to move in response to input acceleration being less than a first threshold level;
    a second suspended structure attached to the first suspended structure by a second suspension member having a second stiffness, the second suspended structure configured to move in response to the input acceleration being less than the first threshold level and to make contact with the one or more mechanical stops when the input acceleration is more than the first threshold level, and wherein the first suspended structure is configured to continue to move on the first and second suspension members with increased stiffness after the contact is made; and
    a readout circuit configured to measure the input acceleration based on movement of the first suspended structure.

2. The MEMS accelerometer of claim 1, wherein the first suspended structure is suspended in an opening of the second suspended structure.

3. The MEMS accelerometer of claim 1, wherein the one or more mechanical stops are mechanically compliant to reduce rebound effects after the contact is made.

4. The MEMS accelerometer of claim 1, wherein the first or second suspension member is a torsion bar.

5. The MEMS accelerometer of claim 1, wherein MEMS accelerometer is a capacitive based MEMS accelerometer and the contact of the second suspended structure with the one or more mechanical stops counteracts a nonlinear capacitive effect inherent in the MEMS accelerometer.

6. The MEMS accelerometer of claim 1, wherein the first and second stiffness are different.

7. The MEMS accelerometer of claim 1, wherein the input acceleration is angular acceleration.

8. The MEMS accelerometer of claim 1, further comprising:
N additional suspended structures attached to the first and second suspended structures by N additional suspension members, the N additional suspended structures configured to move in response to the input acceleration being less than N different threshold levels and to make contact with the one or more mechanical stops when the input acceleration is more than any one of the N threshold levels, and wherein the first suspended structure is configured to continue to move on the first and second suspension members with increased stiffness after the contact is made, where N is a positive integer greater than two.

9. The MEMS accelerometer of claim 1, wherein the MEMS accelerometer is a capacitive based MEMS accelerometer and the first suspended structure is one electrode of a capacitor.

10. The MEMS accelerometer of claim 1, wherein the MEMS accelerometer is a capacitive based MEMS accelerometer and electrodes of the capacitor are attached to, or formed in, the substrate and positioned under the first and second suspended structures.

11. The MEMS accelerometer of claim 1, wherein the readout circuit measures differential capacitance.

\* \* \* \* \*